United States Patent [19]

Jarlsson

[11] Patent Number: 4,650,205
[45] Date of Patent: Mar. 17, 1987

[54] HIGHWAY TRAIN

[76] Inventor: Assar K. Jarlsson, Trien, S-520 47 Vartofta, Sweden

[21] Appl. No.: 601,390

[22] Filed: Apr. 17, 1984

[30] Foreign Application Priority Data

Apr. 29, 1983 [SE] Sweden ................ 8302422

[51] Int. Cl.⁴ ............................................. B62D 53/06
[52] U.S. Cl. ................................ 280/408; 280/423 R; 280/474
[58] Field of Search ............... 280/408, 423 R, 411 C, 280/476 R, 423 A, 474, 80 R, 86, 404, 410, 419, 442, 81 R, 81 A, 83

[56] References Cited

U.S. PATENT DOCUMENTS

| 798,189 | 8/1905 | Koppel | 280/474 |
|---|---|---|---|
| 2,841,094 | 7/1958 | Schumacher | 280/423 R |
| 3,066,953 | 12/1962 | Chosy | 280/81 R |
| 3,151,880 | 10/1964 | Black | 280/408 |
| 3,151,884 | 10/1964 | Felburn | 280/423 R |
| 3,884,502 | 5/1975 | Wagner | 280/423 R |
| 4,111,451 | 9/1978 | Pinto | 280/408 |
| 4,365,820 | 12/1982 | Rush | 280/411 C |

FOREIGN PATENT DOCUMENTS

| 871249 | 2/1953 | Fed. Rep. of Germany . | |
| 1964613 | 12/1969 | Fed. Rep. of Germany | 280/81 R |
| 7805645 | 5/1978 | Netherlands | 280/442 |

Primary Examiner—David M. Mitchell
Assistant Examiner—Donn McGiehan
Attorney, Agent, or Firm—Laff, Whitesel, Conte & Saret

[57] ABSTRACT

In a highway train, a wheeled and steerable, motor-driven vehicle is combined with at least a first load carrier having its forward end portion rested on a first "fifth wheel" supported by the rear portion of the tractive vehicle. An auxiliary wheeled vehicle has a front portion with a second "fifth wheel" supporting the rearward end portion of the first load carrier. A second load carrier has its forward end portion rested on a third "fifth wheel" supported by a rear portion of the auxiliary vehicle. An additional wheeled vehicle supports the rear end portion of the second load carrier. While en route, the first load carrier is supported solely by the first and second "fifth wheels" in such a manner that it is free to occupy a limited angular position in a generally horizontal plane, relative to both the tractive vehicle and the auxiliary vehicle. The auxiliary vehicle has fixed front wheels and rear wheels which are turned through a steering mechanism, in response to any horizontal angular displacement occurring between the first load carrier and the auxiliary vehicle, as when the train passes through a curve. In this manner, the auxiliary vehicle always returns itself into a straight line position with respect to the first load carrier.

13 Claims, 16 Drawing Figures

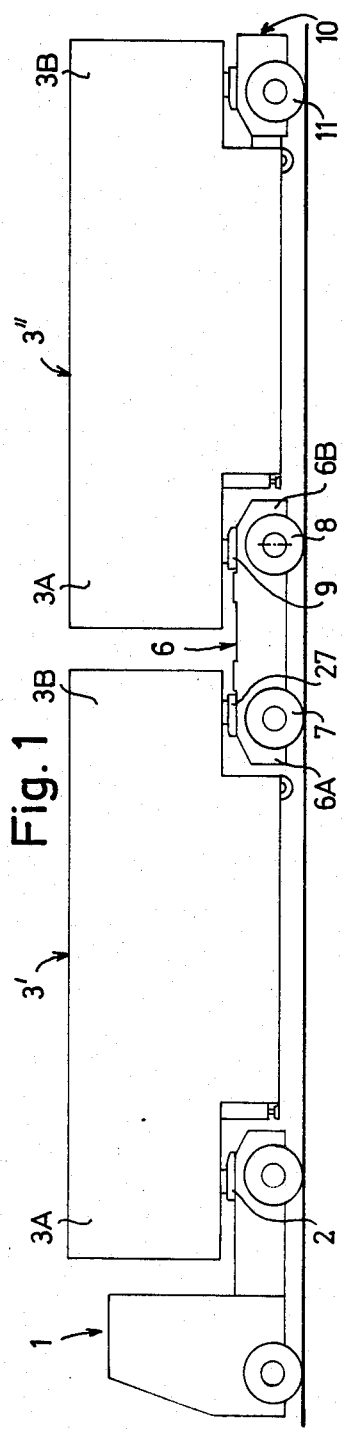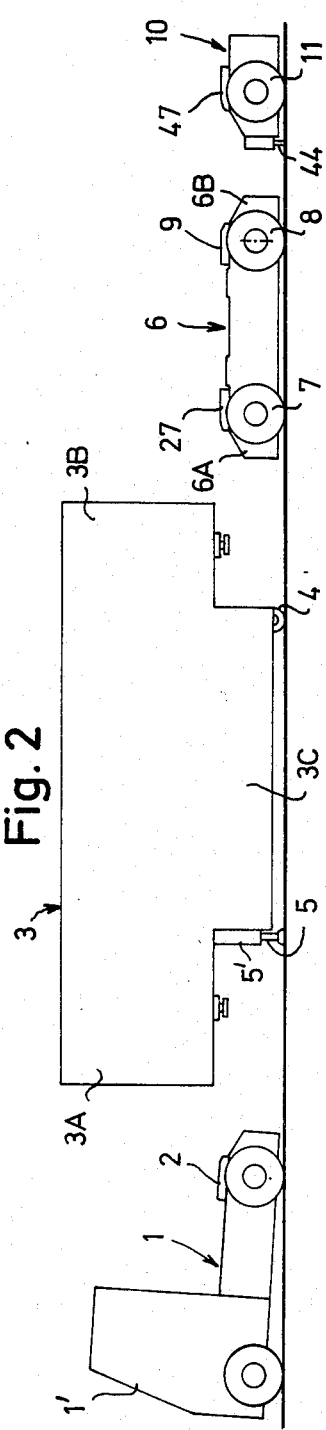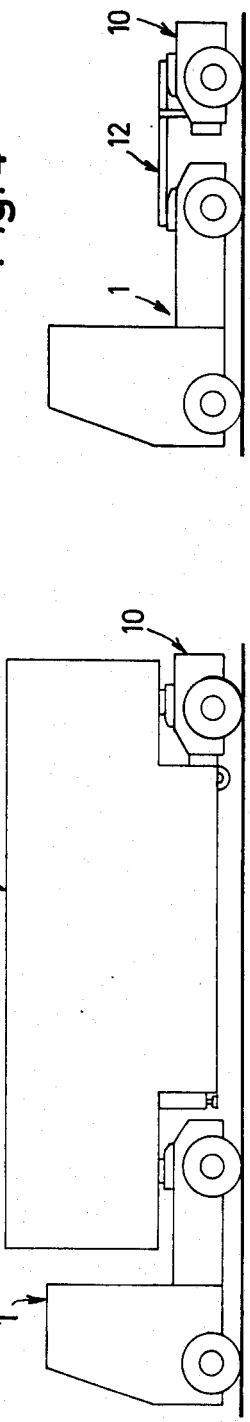

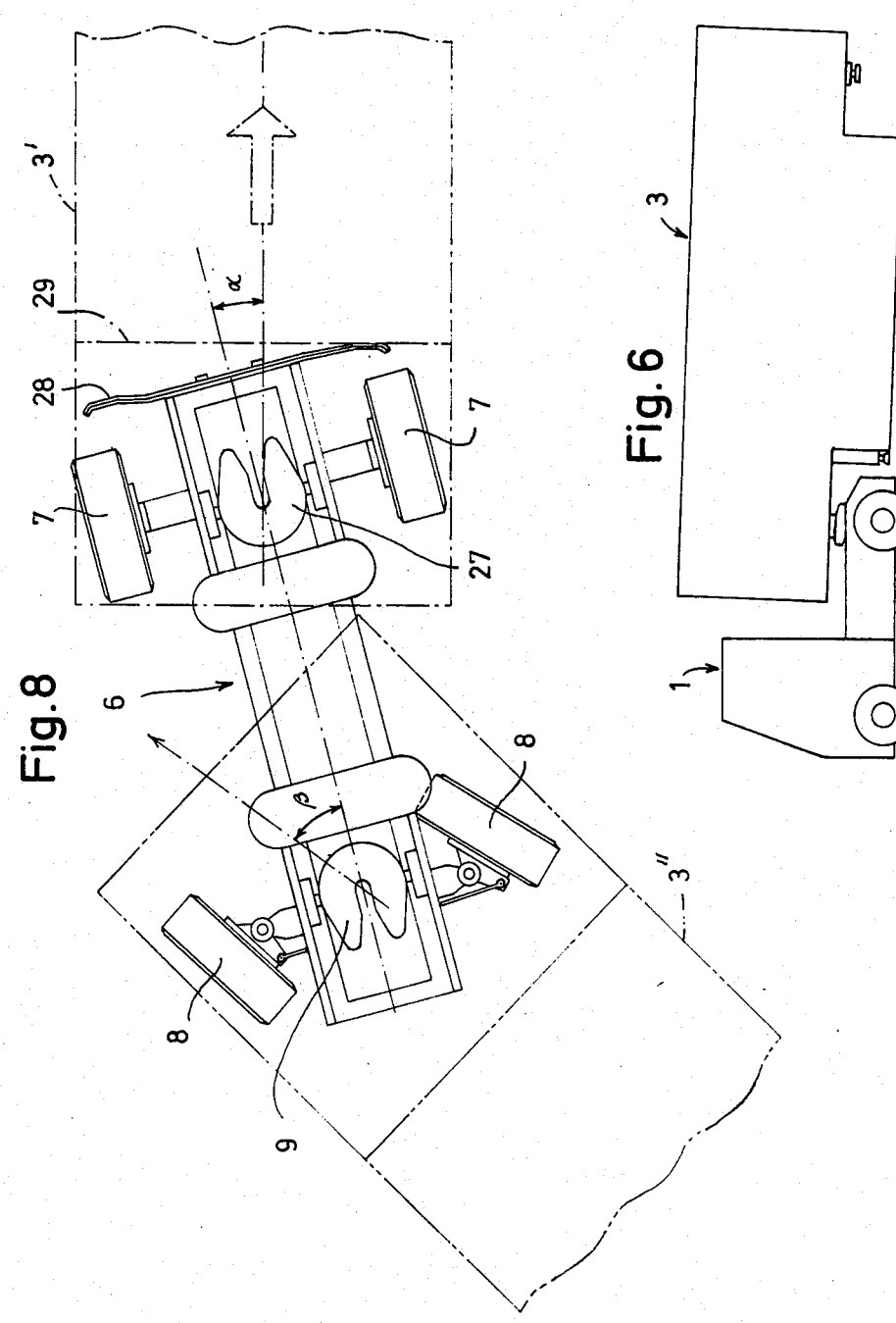

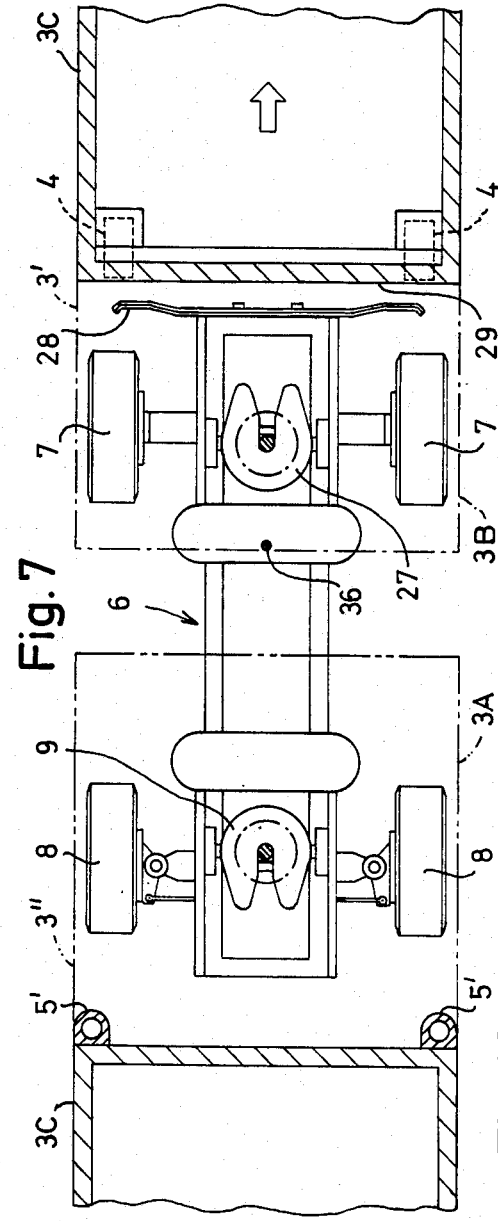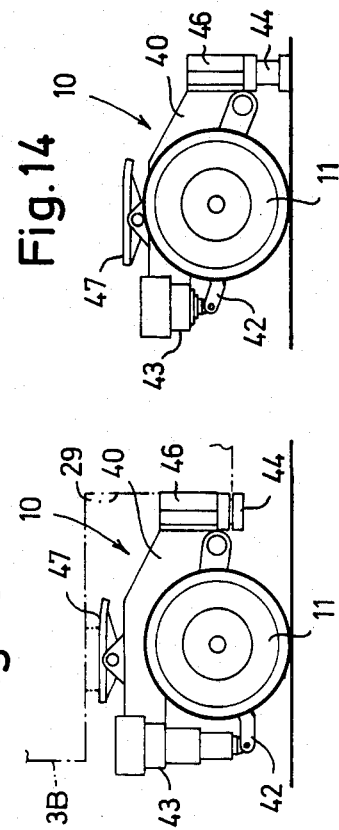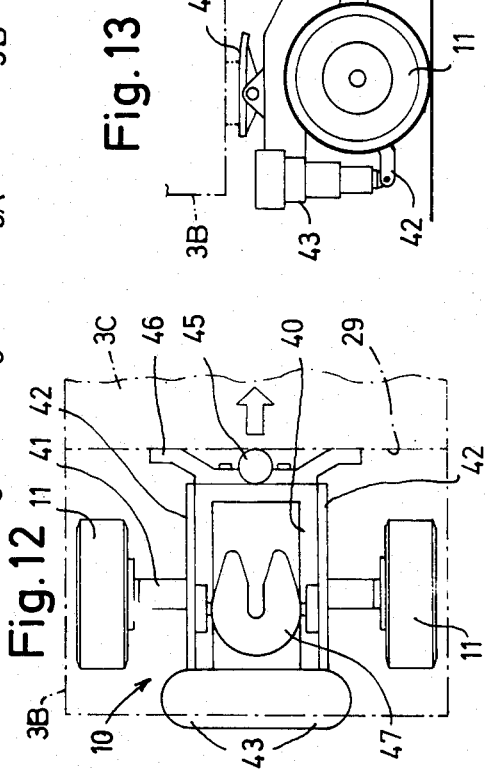

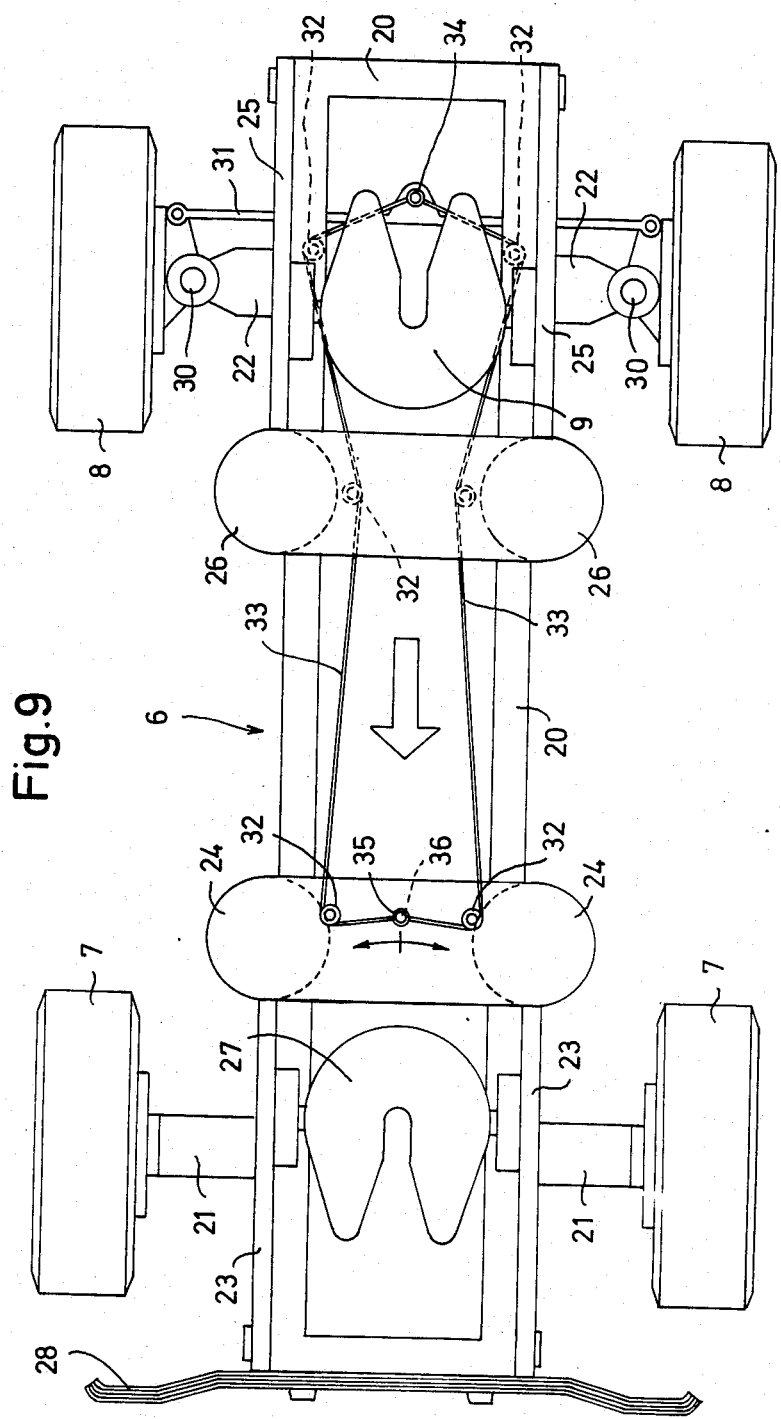

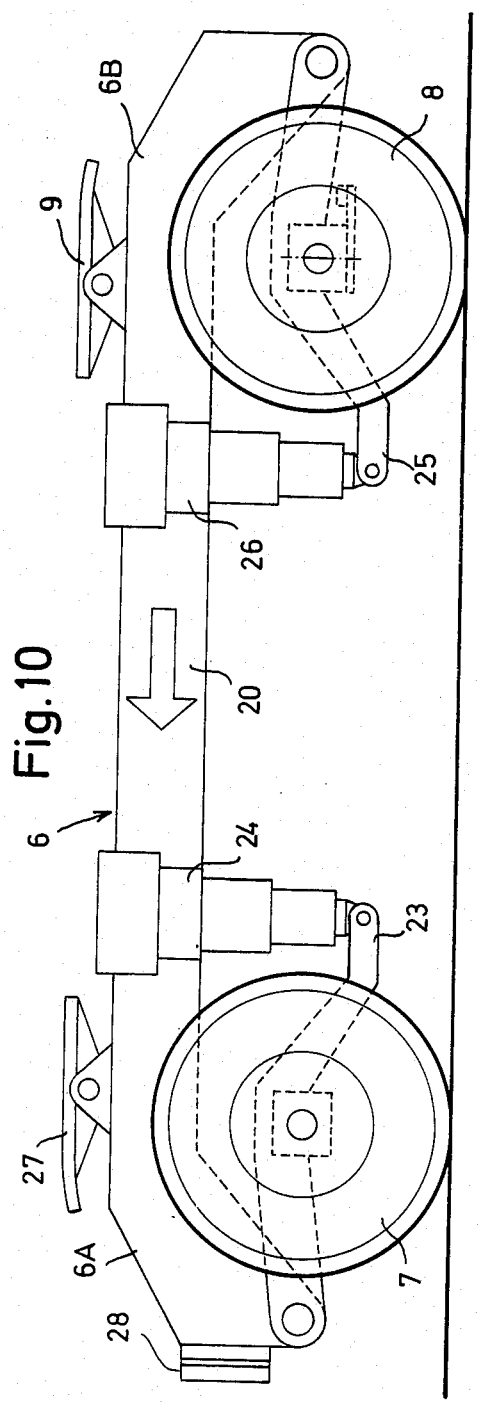
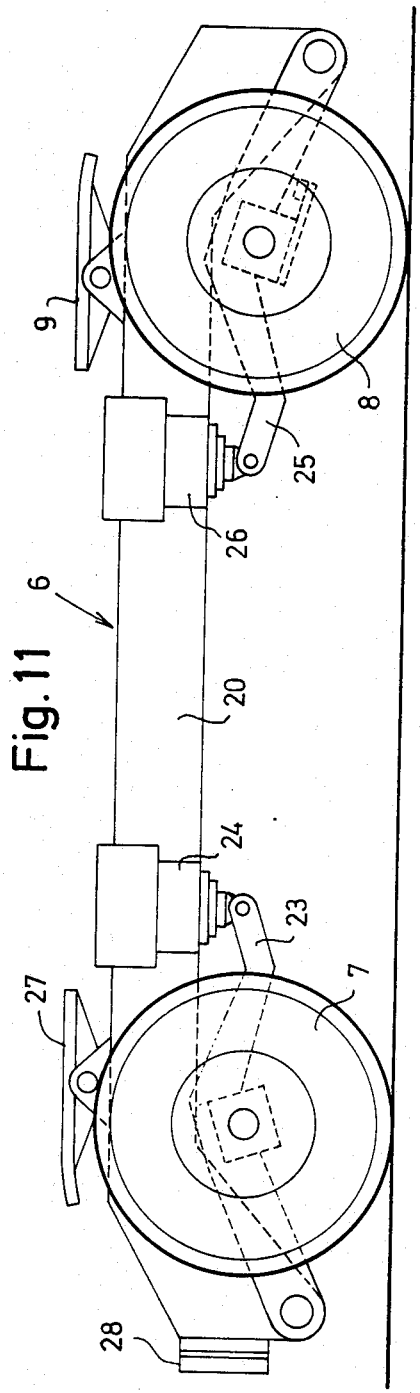

HIGHWAY TRAIN

BACKGROUND OF THE INVENTION

1. Field of the Invention

This invention is concerned with highway trains of the kind in which a wheeled and steerable, motor-driven tractive vehicle having a rear portion is combined at least with a first load carrier having a forward end portion and a rearward end portion of which said forward end portion is rested on said rear portion of the tractive vehicle through the intermediary of a first pivot device capable of permitting horizontal angular displacement between said first load carrier and said tractive vehicle, an auxiliary vehicle having a front portion and a rear portion each of which is supported by at least one associated wheel axle having at least two wheels, said front portion of said auxiliary vehicle supporting said rearward end portion of said first load carrier through the intermediary of a second pivot device capable of permitting horizontal angular displacement between said auxiliary vehicle and said first load carrier, a second load carrier having a forward end portion and a rearward end portion of which said forward end portion is rested on said rear portion of said auxiliary vehicle through the intermediary of a third pivot device capable of permitting horizontal angular displacement between said second load carrier and said auxiliary vehicle, and an additional wheeled vehicle supporting said rearward end portion of said second load carrier, and in which all said vehicles and load carriers are separable from each other and said load carriers are interchangeable with one another.

If needed, such a highway train may be extended by making said additional wheeled vehicle generally similar to said auxiliary vehicle so that it will be able to support by its front portion said rearward end portion of said second load carrier though the intermediary of a fourth pivot device similar to said second one, by adding a third load carrier having a forward end portion and a rearward end portion of which said forward end portion may be rested on a rear portion of the additional wheeled vehicle thus designed through the intermediary of a fifth pivot device similar to said third one, and by also adding a further wheeled vehicle capable of supporting the rearward end portion of said third load carrier and bringing up the rear of the train, said third load carrier then being interchangeable with any one of said first and second load carriers although not necessarily being identical to any one of them.

Apparently a highway train of this kind may, whenever necessary, for instance when arriving at a station where only one of the load carriers is to be left for loading or unloading, be divided and reduced before continuing its journey to a further station. Also, if the train is supplemented with certain simple draw bars adapted to replace the load carriers as will be more closely described hereinafter, all its load carriers may be left at a desired station while only some, or all, of the supporting vehicles are transferred to another station for taking care of another group of load carriers.

2. Description of the Prior Art

In the past many different kinds of highway trains drawn by a tractive vehicle having a first pivot device, commonly known as a "fifth wheel" on its rear portion have been suggested. In most of these trains part of the total load is carried by a semitrailer having its forward end portion rested on the tractive vehicle and its rearward end portion supported by at least one fixed wheel axle, while the remainder of the load is carried by at least one ordinary trailer linked to the semitrailer through a draw bar and having at least one rear axle with fixed wheels and at least one front axle with steerable wheels following the direction of the draw bar. These trains, although extensively used, are unsatisfactory from many points of view, in particular because all the trailing vehicles have their own permanent wheel equipments which cannot be used for other transportation tasks when the frequently time-consuming loading and unloading of the cargo from the vehicles take place. In addition, these trains have a tendency to take a short cut when passing through sharp curves.

In other highway trains drawn by a tractive vehicle of the type already referred to certain load carriers having no wheel of their own and commonly in the form of shipping containers are provided with specially designed, separate supporting wheel axle units adapted to be connected to and disconnected from the lower sides of the load carriers in order to temporarily turn the latter into trailing vehicles which may be drawn in tandem in a certain order. In a typical train of this kind the first load carrier has its forward end portion rested on the tractive vehicle in semitrailer fashion and its rearward end portion supported by a four-wheeled undercarriage which is displaceable longitudinally of the load carrier between two operative and lockable positions in the rearmost one of which a "fifth wheel" on the undercarriage is exposed for receiving and supporting the forward end portion of a second load carrier also forming a kind of semitrailer by having attached under its rearward end portion a removable wheel axle unit. However, in all the trains of this class it is a fairly inconvenient and timeconsuming task to attach and remove the supporting wheel axle or undercarriage units from the load carriers, and also these trains behave objectionably on the road.

Further it has been suggested that in still another kind of highway train intended to be drawn by a tractive vehicle of the type referred to a pair of specially designed trailers each having at least two longitudinally movable supporting wheel axle units of their own with fixed wheels, i.e. wheels which cannot be turned for steering purposes, and each having both its forward and its rearward end portions adapted for connection to a "fifth wheel", such as the one on the tractive vehicle, are combined with an auxiliary vehicle having at least four fixed running wheels mounted on wheel axles which are displaceable longitudinally of the vehicle frame and in addition thereto two "fifth wheels", one on its front portion and another one on its rear portion. On the highway this train at its best and after several wheel axle displacements will be able to act as a combination of three semitrailers in tandem with the auxiliary vehicle forming the second one and having its forward end portion suspended from the rearward end portion of the first trailer. Such a train is not only complex and expensive but will behave poorly on the road and especially in sharp curves.

SUMMARY OF THE INVENTION

The general aim of the present invention is to provide an improved highway train of the kind defined in the introductory paragraph in which the various drawbacks of the prior art trains referred to hereinbefore are eliminated. More specifically it is an object of the invention to provide a highway train which is capable of following an almost ideal path without taking short cuts when being driven through sharp curves and this with a minimum of tire wear and a maximum of lateral stability, and the wheeled vehicles of which may easily be detached from the load carriers proper and thus intensively utilized for alternatingly transporting several sets of load carriers.

According to the invention this aim is basically attained by a particular novel design of the auxiliary vehicle or vehicles used for interconnecting one load carrier to the next and by providing improved cooperation between each such auxiliary vehicle and the load carrier next ahead of it in the train.

Further objects and features of the invention will become apparent from the following description of an embodiment thereof and from the accompanying drawings illustrating the same and to which the description refers.

BRIEF DESCRIPTION OF THE DRAWINGS

In the drawings:

FIG. 1 is a simplified side view of a highway train embodying the invention on the road;

FIG. 2 is a similarly simplified side view of the various components of the same train in their inoperative state but showing only one of the two load carriers thereof as in this particular case they are assumed to be identical;

FIG. 3 is a corresponding side view of a transport combination composed of only some of the components of the complete train;

FIG. 4 is a simplified side view showing the tractive vehicle with the end vehicle connected thereto after having delivered or preparatory to picking up a single load carrier.

FIG. 6 is a simplified side view of the tractive vehicle dragging a single load carrier for switching it within a limited parking area;

FIG. 7 is a plan view of the auxiliary vehicle of the train on an enlarged scale illustrating its coordination with the load carriers next ahead and next behind which are shown in partial horizontal sections;

FIG. 8 is a similar plan view of the auxiliary vehicle illustrating the operation thereof when the train is pulled through a sharp right hand curve;

FIG. 9 is a plan view on a still more enlarged scale of the auxiliarly vehicle also diagrammatically illustrating certain means for steering the rear, right hand wheels thereof;

FIG. 10 is a side view of the auxiliarly vehicle as illustrated in FIG. 9 with its carriage frame in a normal road-running position;

FIG. 11 is a side view similar to FIG. 10 but showing the carriage frame of the auxiliary vehicle in a lowered position as in FIG. 2 and ready for receiving load carriers rested on the ground;

FIG. 12 is a plan view on an enlarges scale of the end vehicle of the train as illustrated in FIG. 1;

FIG. 13 is a side view of the same end vehicle with its frame in a normal road-running position;

FIG. 14 is a side view similar to FIG. 13 but showing the frame of the end vehicle in a lowered position as in FIG. 2 and ready for receiving thereon the rearward end portion of a load carrier rested on the ground;

DESCRIPTION OF THE PREFERRED EMBODIMENT

Figure 5:
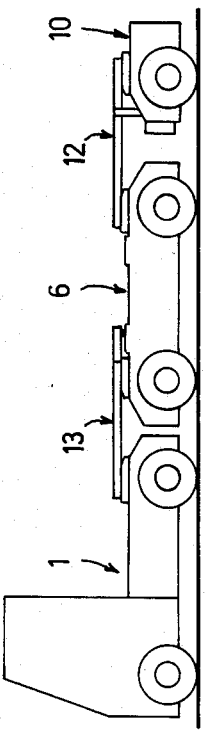
FIG. 5 is a similarly simplified side view showing the tractive vehicle with both the auxiliary vehicle and the end vehicle connected in tandem thereto after having delivered or preparatory to picking up both of two load carriers.

In FIG. 1 there is shown a highway train drawn by a wheeled and steerable, motor-driven tractive vehicle 1, the front portion of which supports a driver's compartment 1' and the rear portion of which supports a pivot device 2 of the kind well known per se permitting pivotal movement about a vertical axis and commonly known as a "fifth wheel" usually comprising a turning plate which is tiltable about a transverse axis and has an inlet slot and a locking device for a so called king pin mounted on the lower side of the forward end portion of a semitrailer. However, other variants of known or conceivable pivot devices may be used if desired.

Further, the highway train shown in FIG. 1 comprises two load carriers 3', 3" which are here represented by elongate containers for the protected transportation of piece goods, but which also could be formed as load-carrying platforms, as liquid transport tanks or the like. Important is that each load carrier 3 is rigid and self-supporting and has a forward end portion 3A which is designed and adapted to be releasably connected to and supported by the pivot device 2 of the tractive vehicle 1, and a rearward end portion 3B which is designed and adapted to be releasably connected to and supported by either an auxiliary vehicle or an end vehicle, as will more specifically appear in the following.

In the example shown each load carrier 3 also has a depressed intermediate portion 3C which, when needed, may be used as cargo space and which is capable of supporting the load carrier when the latter is rested on the ground as in FIG. 2, e.g. for loading or unloading. In the vicinity of the rearward end portion 3B of the load carrier 3 the intermediate portion 3C is provided with a pair of small, usually unsprung, auxiliary wheels 4 which permit moving of the load carrier shorter distances, such as during switching within a limited parking area by means of the tractive vehicle 1 in the manner shown in FIG. 6, but which are not suited for highway transportation of the load carrier. In addition, the load carrier 3 is provided with a pair of protrusible supporting legs 5 which are adjustable in a pair of associated telescopic guides 5' arranged on the front wall of the intermediate portion 3C under the inner portion of the forward end portion 3A.

In the highway train shown in FIG. 1 there is also included an auxiliary vehicle 6, which will be more closely described in the following with reference to FIGS. 7-11. The auxiliary vehicle 6 has a front portion 6A supported by a front wheel axle with wheels 7 and a rear portion 6B supported by a rear wheel axle with wheels 8. All the wheels 7 and 8 are suitable for highway driving and may, when needed, be doubled in order to enable the auxiliary vehicle to withstand high loads. The rearward portion 6B of the auxiliary vehicle supports a pivot device 9, similar to the pivot device 2 of the tractive vehicle 1, for receiving the forward end portion 3A of any one of the load carriers 3.

Finally, in the highway train shown in FIG. 1 there is included an end vehicle 10 supported by a single wheel axle with wheels 11 which likewise are suited for highway driving and which may also be doubled, when needed. The end vehicle 10, which brings up the rear of the train, is adapted to be releasably connected to and to support the rearward end portion 3B of any one of the load carriers 3. If it is desirable to divide the train, the end vehicle may be used for individual transportation of any one of the load carriers 3, the forward end portion of the load carrier then being connected to the tractive vehicle 1, all in the manner shown in FIG. 3.

It should be understood that in case of need the highway train of FIG. 1 may be extended to comprise three or even more load carriers 3 connected in tandem. However in such case the number of auxiliary vehicles 6 must also be correspondingly increased, because the number of auxiliary vehicles must always correspond to the number of load carriers minus one. On the other hand, a single end vehicle 10 will still be sufficient for completing the train irrespective of the number of load carriers.

For a rational utilization of transport equipment permitting the assembly of a highway train of the kind shown in FIG. 1 there is in reality a need for at least one tractive vehicle 1, at least one auxiliary vehicle 6, at least one end vehicle 10 and a plurality of load carriers 3, say at least four. The most suitable number of load carriers depends on many different factors, such as for example the time consumed for the loading and unloading of the goods to be transported thereon, the transport distances, the possibilities of picking up another load carrier at the same time as one is delivered at a station, and so on. Then, of course, all the load carriers must be so designed that they may be connected with their forward end portions either to the tractive vehicle or to the auxiliary vehicle and with their rearward end portions either to the end vehicle or to the auxiliary vehicle. On the other hand, evidently no identity between the load carriers is required as far as size and detailed design is concerned.

Since it must be possible to connect the load carriers 3 to the various supporting vehicles 1, 6 and 10 both rapidly and conveniently when the load carriers are rested on the ground by means of their auxiliary wheels 4 and supporting legs 5, the rear frame portion of the tractive vehicle 1 as well as the frame structures of the auxiliary vehicle 6 and of the end vehicle 10 are vertically adjustable between an elevated position for normal driving, shown in FIG. 1, and a lowered position for interconnection and disconnection, shown in FIG. 2. The elevation and lowering suitably takes place by means of air-spring systems, as will be described in closer detail later on.

As occasions can hardly be avoided when the tractive vehicle 1 without pulling a load carrier must be able to bring along either the end vehicle 10 alone, as in FIG. 4, or both the end vehicle and the auxiliary vehicle 6, as in FIG. 5, from one station to another, the equipment should also include at least two separate draw bars, a first one 12 and a second one 13, which when needed may replace the load carriers 3 as will also be more closely described in the following.

The design of the auxiliary vehicle 6 is shown in greater detail in FIGS. 9-11. It comprises an elongate rectangular frame structure 20 supported by a front wheel axle 21 having the wheels 7 and by a rear wheel axle 22 having the wheels 8, both of said wheel axles occupying generally fixed and predetermined positions longitudinally of the frame structure 20, which rests on the front wheel axle 21 through the intermediary of a pair of vertically swingable arms 23 acted upon by two associated air-spring devices 24 and on the rear wheel axle 22 through the intermediary of two similar arms 25 with associated air-spring devices 26. In addition to providing normal vehicle suspension the air-spring devices 24 and 26 permit lowering and re-elevation of the frame structure, as appears from FIGS. 10 and 11.

The portion of the frame structure 20 located above the rear wheel axle 22 supports the previously mentioned pivot device 9. A further pivot device 27, which is reversed in relation to the pivot device 9 and which does not necessarily need to be identical to the latter, is supported by the frame structure 20 above the front wheel axle 21 in order to receive the rearward end portion 3B of a load carrier 3 in such manner that an angular displacement between this load carrier and the auxiliary vehicle 6 in both directions in the horizontal plane is made possible. An example of such angular displacement is illustrated in FIG. 8. The angular displacement between the load carrier running next ahead and the auxiliary vehicle is limited by a spring device 28 which is mounted at the forward end of the frame structure 20 and which, when the angular displacement reaches a predetermined magnitude, with one at a time of its two free ends comes to abut a vertical rear wall portion 29 on the load carrier 3 (FIGS. 7 and 8) and by doing so will exert a progressively increasing counter-moment, when the angular displacement is increased.

The wheels 7 on the front wheel axle 21 of the auxiliary vehicle 6 are fixed, i.e. cannot be turned for steering, whereas the wheels 8 on the rear wheel axle 22 in a manner known per se can be turned about generally vertical king pins 30 and are mutually interconnected by a tie rod 31. The wheels 8 are steered in response to the angular displacement $\alpha$ (FIG. 8) occurring between the auxiliary vehicle and the load carrier next ahead when the train is driven into and through a curve and this in such manner that the angular displacement $\alpha$ is eliminated during the continued forward movement of the train. Accordingly, the auxiliary vehicle will always seek a position in a straight line with the load carrier next ahead. Preferably the steering of the wheels 8 is arranged in such manner that the angle $\beta$ of lateral deflection of said wheels will be about 2.5–3.0 times greater than the angle $\alpha$, which has been found to render the highway train an optimum ability to make its way even through sharp curves within a minimum of road lane.

In reality this steering of the wheels 8 should preferably be effected by means of a hydraulic force transmission system, which, however, has not been shown because the operation thereof may be difficult to understand. Instead in FIG. 9 there is diagrammatically illustrated a purely mechanical steering transmission operating in the desired manner but less suitable for practical demands. This latter transmission comprises a loop 33 of cable or chain running over pulleys 32. The loop is by means of a first coupling member 34 permanently connected to a center point on the tie rod 31 and has a second coupling member 35 adapted to be releasably connected to an attachment 36 on the lower side of the rearward end portion 3B of the load carrier next ahead, which attachment is situated at such radial distance from the center of the pivot device 27 that the desired transmission ratio is obtained.

It should be readily understood that the fact that the auxiliary vehicle 6 is pivotally connected to the load carrier 3 next ahead by means of the pivot device 27 and, in addition, has rear wheels 8 which are steerable in the manner just indicated will assure a capability of the auxiliary vehicle to follow the load carrier, and hence indirectly also the tractive vehicle 1, in a unique manner which is very favorable from several different points of view. Thus the tire wear is kept at a minimum and an optimum lateral stability of the highway train in taking curves is assured. At the same time the auxiliary vehicle 6 in taking a curve is caused to follow a path which considerably reduces the tendency of the successive load carrier to take a short cut. In other words, the highway train is rendered an improved capability to turn e.g. at street corners without therefore requiring a lane of great width.

The end vehicle 10 is shown in FIGS. 12-14 and comprises a relatively short, rectangular frame structure 40 supported by a wheel axle 41 having the wheels 11, which are fixed, i.e. cannot be turned. The frame structure 40 rests on the wheel axle 41 through the intermediary of a pair of vertically swingable arms 42 acted upon by two associated air-spring devices 43, which in addition to normal vehicle suspension permit lowering and re-elevation of the frame structure 40 as appears from FIGS. 13 and 14. At its forward end the frame structure is provided with a centrally located supporting leg 44 which is protrusible from a guiding sleeve 45 secured to the frame structure, as well as with a yoke 46 which is adapted to abut the vertical wall portion 29 of the load carrier 3 running next ahead which has been previously mentioned in connection with the spring device 28 of the auxiliary vehicle 6.

On its upper side the frame structure 40 of the end vehicle 10 supports a coupling device 47 which somewhat resembles the pivot device 27 on the front portion 6A of the auxiliary vehicle 6 and which permits connection of the end vehicle to the rearward end portion of the load carrier running next ahead. It should be noted, however, that there will be no pivotal movement between the end vehicle 10 and this load carrier 3 next ahead, because the yoke 46 will prevent such movement by abutting the wall portion 29.

The air-spring devices 24 and 26 on the auxiliary vehicle 6 as well as the air-spring devices 43 on the end vehicle 10 are supplied with compressed air from the tractive vehicle 1 through conduits and conduit couplings, not shown. Suitably this is effected through separate conduits to each pair of air-spring devices so that the elevating operation of the various pairs may be individually remote-controlled by means of a valve arrangement, not shown, on the tractive vehicle 1. Also the tractive vehicle itself has similar air-spring devices at least for elevating and lowering its rear frame portion in the manner previously indicated.

Figure 15:
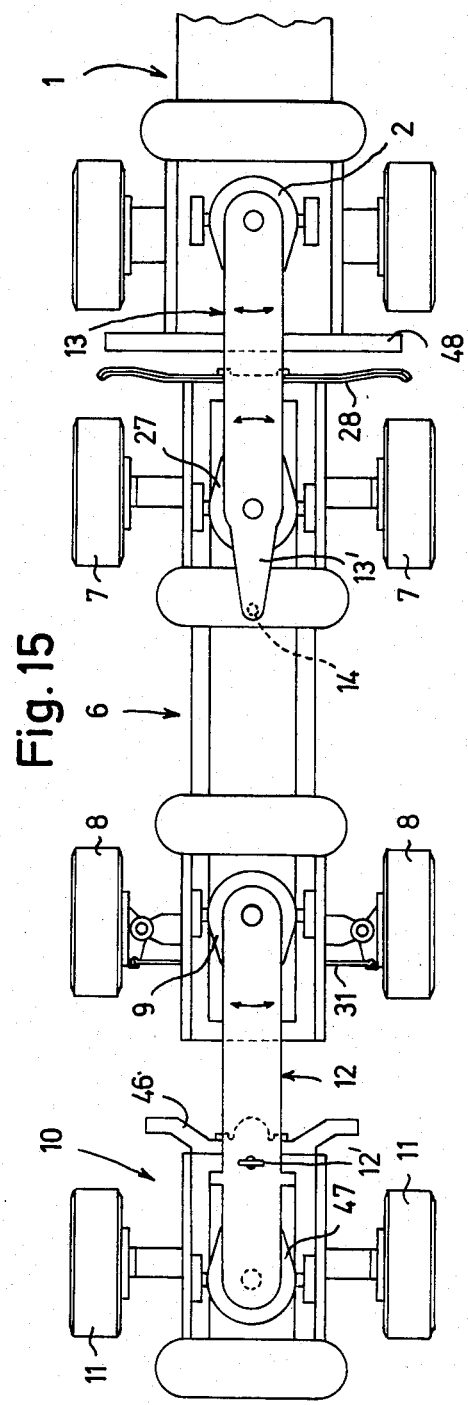
FIG. 15 is a plan view showing on an enlarged scale a portion of the tractive vehicle, the auxiliary vehicle and the end vehicle when being connected in tandem for transportation as in FIG. 5 without any load carriers thereon.
Figure 16:
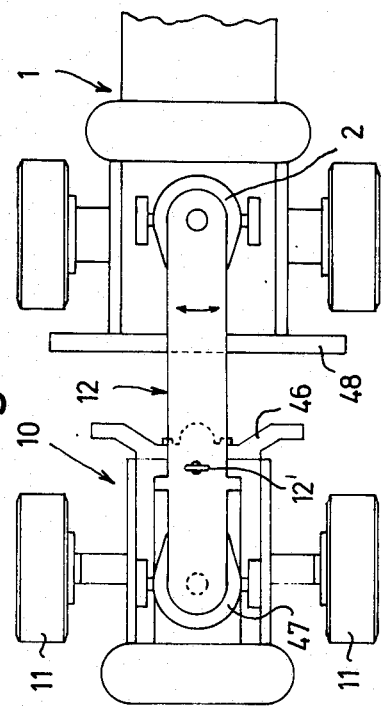
FIG. 16 is a plan view similar to FIG. 15 but illustrating a portion of the tractive vehicle with only the end vehicle connected thereto as in FIG. 4.

From FIGS. 15 and 16 it more closely appears how the load carriers can be replaced by the draw bars 12 and 13. The rearward end portion of the draw bar 12 is first rigidly connected to the end vehicle 10 by engaging the coupling device 47 in the same manner as does any one of the load carriers 3 and by being locked to the end vehicle frame by means of a suitable locking device 12′, whereupon the forward end of the draw bar 12 may be pivotally connected either to the pivot device 2 of the tractive vehicle 1 (FIG. 16) or to the rear pivot device 9 on an auxiliary vehicle 6 (FIG. 15). The draw bar 13 is in its turn connected as a link between the pivot device 2 of the tractive vehicle 1, or the corresponding pivot device 9 on an auxiliary vehicle running next ahead, if there are more than one such vehicle, and the forward pivot device 27 on the drawn auxiliary vehicle and has a rearwardly directed extension 13′ with an attachment 14, corresponding to the attachment 36 on each load carrier 3, from which a force for steering the rear wheels 8 of the auxiliary vehicle 6 is derived in the manner previously indicated.

It is to be noted that, when the auxiliary vehicle is towed by means of the draw bar 13, the spring device 28 of the auxiliary vehicle 6 co-operates with a crossbeam 48 mounted at the rear end of the tractive vehicle 1. If there is a need for towing several auxiliary vehicles, one behind the other, in consequence with the aforesaid each of them must be provided with a corresponding crossbeam at its rear end.

As the drawings are only intended to illustrate the basic inventive concepts, many modifications of details of the various components are not only conceivable but also in many cases necessary in order to meet practical demands. As an example of such modifications it may be mentioned that double wheel axles may be required in front as well as behind in each auxiliary vehicle 6 as also in the end vehicle 10 and at least at the rear of the tractive vehicle 1.

I claim:

1. A highway train comprising in combination:
   (A) a wheeled and steerable, motor-driven tractive vehicle having a rear portion;
   (B) an auxiliary vehicle having a front portion and a rear portion, said front portion of said auxiliary vehicle being permanently supported by at least two associated forward wheels, and said rear portion of said auxiliary vehicle being permanently supported by at least two associated rearward wheels, said forward wheels which support the front portion of said auxiliary vehicle being non-steerable, and said rearward wheels which support the rear portion of said auxiliary vehicle being steerable;
   (C) an additional wheeled vehicle;
   (D) a first load carrier having a forward end portion and a rearward end portion, said forward end portion of said first load carrier being rested on and detachably connected to said rear portion of said tractive vehicle through the intermediary of a first pivot device for enabling a horizontal angular displacement between said first load carrier and said tractive vehicle, and said rearward end portion of said first load carrier being rested on and detachably connected to said front portion of said auxiliary vehicle through the intermediary of a second pivot device for enabling a horizontal angular displacement between said first load carrier and said auxiliary vehicle;
   (E) said first load carrier being supported solely by said tractive vehicle at said forward end portion and by said auxiliary vehicle at said rearward end portion, when the train is on the road;
   (F) a second load carrier having a forward end portion and a rearward end portion, said forward end portion of said second load carrier being rested on and detachably connected to said rear portion of said auxiliary vehicle through the intermediary of a third pivot device for enabling a horizontal angular displacement between said second load carrier and said auxiliary vehicle, and said rearward end portion of said second load carrier being rested on and detachably connected to said additional wheeled vehicle;

(G) said second load carrier being supported solely by said auxiliary vehicle at said forward end portion and by said additional wheeled vehicle at said rearward end portion, when the train is on the road;

(H) said first and second load carriers being interchangeable with one another in a train and having their own supporting means for enabling each of them to be rested on the ground when detached from the train;

(I) said steerable rearward wheels supporting the rear portion of said auxiliary vehicle being steered exclusively in response to any horizontal angular displacement occurring between said load carriers and said tractive auxiliary vehicles when the train is driven through a curve, said steering causing said auxiliary vehicle to seek a position behind and in a straight line with said first load carrier in continued forward movement of the train.

2. A highway train according to claim 1 further comprising steering means for said steerable rearward wheels of said auxiliary vehicle for imparting a lateral deflection to said rearward wheels which is considerably greater than the horizontal angular displacement occurring between said first load carrier and said auxiliary vehicle when the train is driven through a curve.

3. A highway train according to claim 2 wherein said steering means are arranged to impart a lateral deflection which is between 2.5 and 3.0 times greater than the horizontal angular displacement occurring between said first load carrier and said auxiliary vehicle.

4. A highway train according to claim 1, wherein said first load carrier and said auxiliary vehicle have interengaging means for yieldably limiting the horizontal angular displacement occurring between them when the train is driven through a curve, and for exerting a progressively increasing counter-directed moment to them, when the magnitude of such angular displacement approaches a predetermined acceptable maximum in either direction.

5. A highway train according to claim 1 wherein said supporting means for enabling each of said first and second load carriers to be individually rested on the ground include forward and rearward supports operative to keep the corresponding ones of said forward and rearward end portions of the load carrier in positions in which the lower sides thereof are a considerable distance above the ground, and wherein each of said rear portion of said tractive vehicle, said front and rear portions of said auxiliary vehicle and said additional vehicle, respectively, is vertically adjustable between a first, lowered position, in which it is able to enter underneath its related end of the rested load carriers, and a second, elevated position, in which it is able to support its related load carrier end portion sufficiently high above the ground to make the corresponding load carrier support inoperative.

6. An auxiliary vehicle for use in a highway train of the kind including a wheeled and steerable, motor-driven tractive vehicle adapted for pulling load carriers in semitrailer fashion, and two load carriers connected in tandem by means of said auxiliary vehicle, each of said load carriers having a forward end portion and a rearward end portion, said auxiliary vehicle comprising:

(A) an elongated rigid frame structure having a front portion and a rear portion;

(B) at least two forward wheels permanently supporting said front portion of said frame structure, said forward wheels being non-steerable;

(C) at least two rearward wheels permanently supporting said rear portion of said frame structure, said rearward wheels being steerable;

(D) a front pivot device mounted on said front portion of said frame structure and adapted to receive and support the rearward end portion of the foremost one of said two load carriers;

(E) a rear pivot device mounted on said rear portion of said frame structure and adapted to receive and support the forward end portion of the rearmost one of said two load carriers;

(F) means for adjusting the heights of said front and rear pivot devices relative to said forward and rearward wheels, respectively; and (G) steering means for steering said rearward steerable wheels exclusively in response to any horizontal angular displacement occurring between the auxiliary vehicle and the foremost one of said two load carriers when the train is driven through a curve and in a manner which causes the auxiliary vehicle to seek a position behind and in a straight line with said foremost load carrier in continued forward movement of the train.

7. An auxiliary vehicle according to claim 6 wherein said steering means are arranged to impart to said steerable wheels a lateral deflection which is between 2.5 and 3.0 times greater than the angular displacement occurring between the auxiliary vehicle and the foremost one of said two load carriers.

8. An auxiliary vehicle according to claim 6, wherein spring means are provided on said frame to yieldably limit the horizontal angular displacement occurring between the auxiliary vehicle and the foremost one of said two load carriers and to exert a progressively increasing correcting moment, when the magnitude of such angular displacement approaches a predetermined acceptable maximum in either direction.

9. A highway train comprising a wheeled and steerable, motor-driven tractive vehicle and:

(A) a first load carrier having a forward end portion which is supported by and detachably connected to a rear portion of said tractive vehicle through the intermediary of a first pivot device for enabling a horizontal angular displacement between said first load carrier and said tractive vehicle;

(B) an auxiliary vehicle having an elongate frame supported by at least four wheels, said four wheels including non-steerable wheels permanently supporting a front portion of said auxiliary vehicle frame, and also including steerable wheels permanently supporting a rear portion of said frame, said front portion of said frame being detachably connected to a rearward end portion of said first load carrier through the intermediary of a second pivot device for enabling a horizontal angular displacement between said frame and said first load carrier and for enabling a leading of said front portion of said frame while letting said rear portion thereof trail freely, said steerable wheels supporting said rear portion of said auxiliary vehicle frame being steered exclusively in response to any horizontal angular displacement occurring between said frame and said first load carrier, when the train is driven through a road curve, and in a manner to cause said auxiliary vehicle frame to seek a position behind said first load carrier and in a straight line therewith responsive to a continued forward movement of the train;

(C) a second load carrier having a forward end portion which is supported by and detachably connected to said rear portion of said auxiliary vehicle frame through the intermediary of a third pivot device for enabling a horizontal angular displacement between said second load carrier and said frame and for enabling a leading of said forward end portion of said second load carrier while letting a rearward end portion thereof trail freely, said forward end portion of said second load carrier being caused to follow a path which deviates from the path followed by said rearward end portion of said first load carrier; and (D) an additional wheeled vehicle supporting said rearward end portion of said second load carrier and being detachably connected thereto; and in which the highway train of said first and second load carriers are interchangeable with one another and are supported solely by said vehicles when the train is on the road.

10. A highway train according to claim 9 wherein said steerable wheels of said auxiliary vehicle frame are steered by means which are operative solely in response to such horizontal angular displacement ($\alpha$) between said freely trailing auxiliary vehicle frame and said first load carrier which occurs as a result of said tractive vehicle pulling the forward end portion of said first load carrier laterally away from an imaginary extension of the path followed by said auxiliary vehicle frame, said steering means being operative to impart to said steering wheels a lateral deflection ($\beta$) relative to said frame which is greater than the horizontal angular displacement ($\alpha$) occurring between said auxiliary vehicle frame and said first load carrier.

11. The highway train according to claim 10 wherein said steering means are arranged to impart to said steerable wheels a lateral deflection ($\beta$) relative to said auxiliary vehicle frame which is in the range between approximately 2.5 and about 3.0 times greater than the horizontal angular displacement ($\alpha$) occurring between said frame and said first load carrier.

12. The highway train of claim 9 wherein said first load carrier and said auxiliary vehicle have interengageable means for yieldably limiting the horizontal angular displacement ($\alpha$) occurring between them and for exerting a progressively increasing counter-directed moment on them, when the magnitude of such angular displacement ($\alpha$) approaches a predetermined acceptable maximum in either direction.

13. The highway train of claim 9 wherein each of said first and second load carriers has supporting means permitting the load carrier to be rested on the ground in a position in which the lower sides of said forward and rearward end portions thereof are a considerable distance above the ground, and wherein at least the rear portion of said tractive vehicle, the front and rear portions of said auxiliary vehicle and said additional vehicle are all vertically adjustable between a first lowered position in which they are able to enter underneath said forward and rearward end portions of said load carriers, when said load carriers are in their said rested positions, and a second elevated position in which they support said load carriers well above the ground.

* * * * *

UNITED STATES PATENT AND TRADEMARK OFFICE
CERTIFICATE OF CORRECTION

PATENT NO. : 4,650,205
DATED : March 17, 1987
INVENTOR(S) : Assar K. Jarlsson

It is certified that error appears in the above-identified patent and that said Letters Patent is hereby corrected as shown below:

In Col. 9, lines 19-20, change to read "displacement occurring between said first load carrier[s] and said [tractive] auxiliary vehicle[s] when the train";

In Col. 9, line 59, insert --portion-- after "end"; and

In Col. 11, line 24, change to read "which [the] highway train [of] said first and second".

Signed and Sealed this

First Day of March, 1988

Attest:

DONALD J. QUIGG

Attesting Officer

Commissioner of Patents and Trademarks